United States Patent [19]
Jureit

[11] 4,157,676
[45] Jun. 12, 1979

[54] LAP-JOINT FASTENER
[75] Inventor: John C. Jureit, Coral Gables, Fla.
[73] Assignee: Automated Building Components, Inc., Miami, Fla.
[21] Appl. No.: 838,292
[22] Filed: Sep. 30, 1977
[51] Int. Cl.² ............................................. E04B 1/38
[52] U.S. Cl. .......................................... 85/13; 85/11; 85/14; 403/405; 52/DIG. 6
[58] Field of Search ................. 85/11, 13, 14; 52/715, 52/DIG. 6; 403/405, 280, 285

[56] References Cited
U.S. PATENT DOCUMENTS

| | | | |
|---|---|---|---|
| 2,099,273 | 11/1937 | Myer | 85/14 X |
| 2,885,749 | 5/1959 | Jureit | 20/92 |
| 3,172,171 | 3/1965 | Knight | 20/92 |
| 3,261,137 | 7/1966 | Jureit | 52/483 |
| 3,382,752 | 5/1968 | Black et al. | 85/13 |
| 3,400,672 | 9/1968 | Dickson | 85/13 X |
| 3,529,918 | 9/1970 | Jureit | 85/13 |
| 3,841,195 | 10/1974 | Jureit | 85/13 |

Primary Examiner—Price C. Faw, Jr.
Assistant Examiner—Carl D. Friedman
Attorney, Agent, or Firm—LeBlanc and Shur

[57] ABSTRACT

There is provided a fastener for forming lap-type joints wherein a sheet metal plate has a plurality of teeth projecting in a substantially perpendicular direction from both sides of the plate. On one side of the plate the teeth are in rows of single teeth and on the opposite side of the plate the teeth are in rows of pairs of teeth. The ends of the single teeth are such that upon movement into a nailable member the teeth remain substantially perpendicular to the plate, while the ends of the paired teeth upon movement into a nailable surface are displaceable from the perpendicular direction and accomplishing a clenching between adjacent paired teeth. The paired teeth are of smaller cross-sectional area than the single teeth and may be placed into relatively fragile or thin material to provide secure fastening thereof to a more substantial material, e.g. wooden studs and the like.

6 Claims, 6 Drawing Figures

U.S. Patent   Jun. 12, 1979   4,157,676
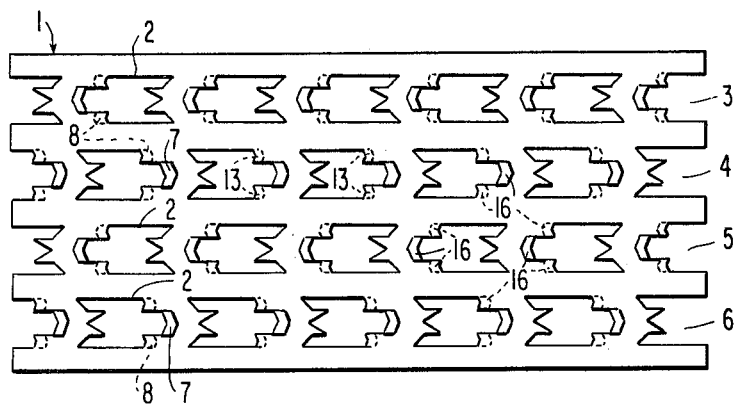
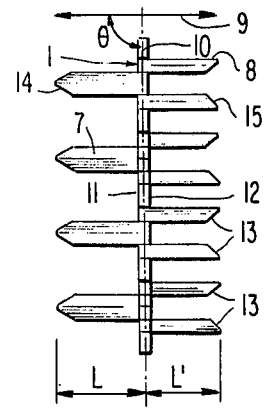
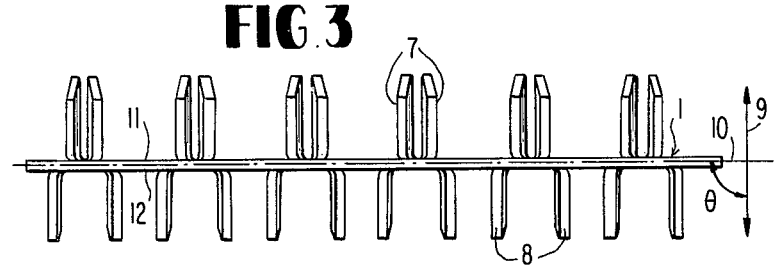
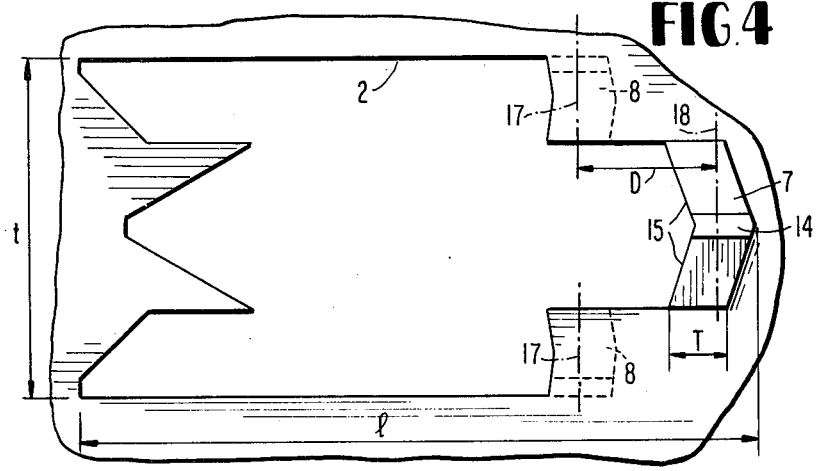
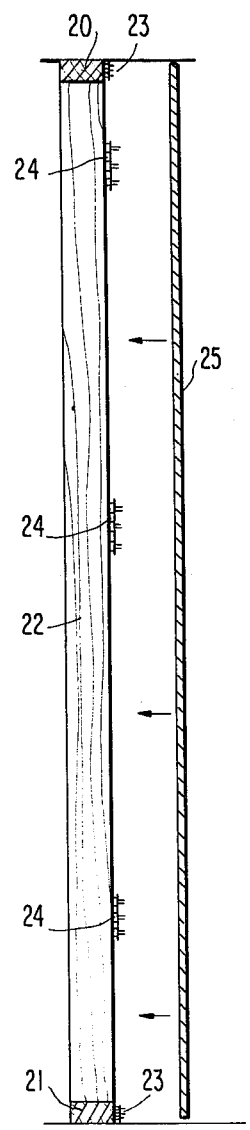
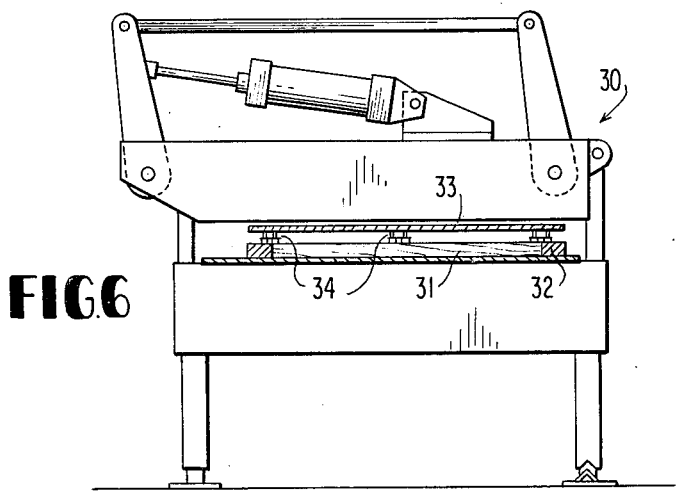

LAP-JOINT FASTENER

The present invention relates to fasteners for providing a lap joint and to lap joints assembled therewith. More particularly, the invention relates to such fasteners with teeth projecting from opposite sides of a sheet metal plate and where the disposition and configuration of the teeth provide exceptional advantages in forming lap joints between difficult to join materials.

BACKGROUND OF THE INVENTION

Lap joints are defined for purposes herein as joints between two parallel surfaces. The traditional way of forming a lap joint is simply that of driving a fastener, e.g. nails, staples, brads, screws and the like through one of the materials and into the other material to be joined. In certain constructions, however, it is not desired that the fastener be driven through one or both of the materials to be joined. For example, when conventional wallboard is placed on wooden studs by driving nails therethrough, the indentations created by the nail heads must be spackled and sanded smooth, thus, increasing the labor required for such construction. Similarly, in forming a lap joint between wood paneling and wall studs, driving nails through the wood paneling leaves and unsightly appearance. The use of finishing nails decreases the obtrusiveness of the nail heads, but the appearance of the panel is, nonetheless, marred. To avoid this difficulty, the very time consuming method of towing the finishing nails into the panel is often employed. In yet another example, when container pallets are constructed, lap joints formed by nailing the plates to the stringers allow the nailheads to contact containers on the pallet, e.g. paper bags and the like, with the result that some of the containers are damaged. Continued use of such nailed pallets can also result in the plates being dislodged from the stringer and failure of the pallet.

Thus, as has been long recognized in the art, there are many constructions which ideally utilize fasteners which are referred to as "hidden fasteners". These fasteners, in general, have securing projections from both sides of a plate so that the projections may be driven into both members of the lap joint and secure the two together. Hidden fasteners of this nature, however, have several inherent difficulties. As can be easily appreciated, since the projections must not penetrate through one of the two members, for certain lap joints the projections must be relatively short in length, e.g. securing wallboard and wooden paneling to wall studs. The relatively short projections, and without a keeping device such as a nail head, substantially reduce the resistance to separation of the two members. If the number of projections is simply increased, the chances of splitting or disintegrating one or both of the members of the lap joint is substantially increased, particularly in connection with wallboard and thin paneling.

As can also be appreciated, since the projections must be driven into at least one of the members of the lap joint by applying a pressure to one of the members, the chances of marring one or both of the members is substantially increased. Accordingly, the amount of force required to cause penetration of a projection into at least one of the members must be kept as low as possible in order to minimize such marring. This is of particular concern in soft or crushable materials, such as wallboard and soft wall paneling.

Further, in certain materials the chances of splitting or crushing the material substantially increases with the number of projections which must penetrate the material. Again, this is particularly true with materials such as wall paneling or crushable material such as wallboard. Under these circumstances, simply increasing the number of projections to increase the strength of the lap joint is not acceptable.

Accordingly, it would be substantial benefit to provide fasteners of a type described above, but where these fasteners may be used in these more exacting applications. It would be a further advantage in the art if such fasteners could also provide relatively strong lap joints, even in thin and crushable materials, and without substantially marring those materials.

OBJECTS OF THE INVENTION

Accordingly, it is an object of the invention to provide an improved fastener for forming lap-type joints between nailable members, wherein the fastener is of the hidden type and where the fastener may be used with thin and crushable materials. It is a further object of the invention to provide such fasteners where the strength of the lap joint so formed is substantially increased, as compared with lap joints made with conventional hidden fasteners. It is a further object of the invention to provide such fasteners in a form which allows the application thereof either in on-the-site construction or in prefabrication operations. Finally, as an object of the invention to provide such fasteners for difficult and specialized construction, e.g. wallboard and paneling, while at the same time providing a form such that the fasteners may be used in general construction, and, hence, extending the applicability of the fasteners. Other objects will be apparent from the following disclosure and claims.

BRIEF DESCRIPTION OF THE INVENTION

The present invention is based on three primary discoveries. Firstly, fasteners of the hidden type for use in the difficult constructions, e.g. wall paneling, wallboard, can be substantially improved where the number of teeth projecting from one side of the fastener is greater than the number of teeth projecting from the opposite side of the fastener. This provides different tooth functions on the two sides of the fastener so that problems associate with prior art fasteners can be substantially mitigated in the more difficult to form lap joints.

Secondly, the teeth on the side of the fastener which has the greater number of teeth (greater teeth density) are formed in rows of pairs of teeth. When driven into a nailable member, the paired teeth are displaceable from the perpendicular to the fastener plate, and accordingly, portions of the nailable member may be clenched between adjacent paired teeth. This substantially increases the withdrawal resistance and, accordingly, those teeth may be quite short so that they will not protrude through either wall paneling or wallboard, while still providing very strong lap joints.

Thirdly, the teeth on the opposite side of the fastener (the lower teeth density) are in the form of rows of single teeth and are configured such that upon being driven into the nailable member the teeth remain substantially in the perpendicular direction to the fastener plate. This arrangement allows not only simultaneous embedding of the teeth on both sides of the fastener but further allows use of the fastener in a wide variety of construction applications beyond the difficult to form lap joints, as discussed above.

Accordingly, there is provided a fastener for forming lap-type joints between nailable member comprising, a planar sheet metal plate, a plurality of teeth integral with and struck from the plate and projecting in a substantially perpendicular direction from the plane of the plate. A first smaller portion of the teeth project from one side of the plate to form rows of single teeth and a second larger portion of the teeth project from the other side of the plate to form rows of pairs of teeth. The ends of the single teeth have surfaces such that upon movement of the single teeth into a nailable member, the single teeth remain in the substantially perpendicular direction. The ends of the paired teeth have surfaces such that upon movement of the paired teeth into a nailable member, the paired teeth are displaced from the substantially perpendicular direction, whereby portions of the nailable member can be clenched between adjacent paired teeth.

Preferably, the ratio of the sectional area of the single teeth to that of the paired teeth is greater than 1:1, e.g. at least approximately 2:1. These ratios insure the functions noted above.

Also, most preferably, one single tooth and two paired teeth are struck from the plate such that they are associated with a single slot and project from the same longitudinal side of the slot with which they are associated. This provides significantly increased columnar strength and resists buckling of the teeth when driven into the nailable members. In this arrangement, the single teeth will have been formed from the metal of the plate in between the metal from which the paired teeth are formed.

These fasteners may be used to prepare a lap-joint comprising a first nailable member, a second nailable member at least in part parallel to the first nailable member and the first and second nailable members are joined by the fastener, as described above. With such joints, the paired teeth can be embedded in wood, wood derived materials, and plaster board, providing an acceptably strong joint. The single teeth may be embedded in top and bottom plates of studs of a timber wall panel to form the panel, while the paired teeth may be embedded in wallboard or wall paneling to form a preformed panel.

BRIEF DESCRIPTION OF THE DRAWINGS

FIG. 1 shows a top view of the present fastener, with the view looking onto rows of single teeth;

FIG. 2 shows an end view of the fastener of FIG. 1;

FIG. 3 shows a side view of the fastener of FIG. 1;

FIG. 4 is an enlarged single slot of FIG. 1;

FIG. 5 shows the construction of a lap joint according to the present invention; and FIG. 6 shows a prefabrication operation using the fasteners of the present invention.

DETAILED DESCRIPTION OF THE INVENTION

The fastener is in the form of a sheet metal plate, generally, 1, which is also referred to in the art as a nail plate or connector. The plate has a plurality of slots 2 which lie in rows 3, 4, 5, and 6, as shown in FIG. 1. The slots are the voids remaining in the plate after the teeth had been struck from the plate. The teeth are struck in a conventional manner by using a die and punch. In the present invention, however, the die and punch cooperate to produce rows of single teeth 7 projecting from one side of the plate and rows of pairs of teeth 8 (shown in dotted lines in FIG. 1) projecting from the opposite side of the plate.

As can be seen from FIGS. 1-3, the teeth are integral with and struck from the plate and project in a substantially perpendicular direction, as shown by arrow 9, from the plane 10 of the plate, as shown by the dotted line. In this regard, the term "substantially" indicates that the projection of the teeth 7 and 8 is not necessarily either a straight line or at 90°. The projection may vary somewhat from a straight line, particularly bearing in mind manufacturing variations, but the projections should be sufficiently straight that the teeth do not displace substantially from the perpendicular direction until at least after being embedded into nailable substrates. Similarly, the teeth may vary from a perpendicular direction by an angle $\theta$ which should be at least 80° and more preferably at least 85°. Optimumly, of course, $\theta$ will be 90°.

As can be best seen from FIG. 2, a first smaller portion of the teeth project from one side 11 of the plate and form rows of single teeth 7 (see FIG. 1). A second larger portion of the teeth project from the other side 12 of the plate to form rows of pairs of teeth 13.

The ends of the single teeth 7 have surfaces such that on movement of the single teeth into a nailable member, the single teeth remain in the substantially perpendicular direction. While these surfaces may take many forms, a convenient form is that simply of a chisel shape, as more clearly shown in FIG. 2. The chisel shape simply has a pointed end 14. This shape will drive the tooth straight into the nailable member to substantially avoid displacement of the tooth from the perpendicular direction. To further increase resistance of the single teeth from displacement from the perpendicular direction, the single teeth are, preferably, formed into a concave inner surface 15 (see FIG. 4).

On the other hand, the ends of paired teeth 13 have surfaces such that upon movement of a paired teeth into a nailable member the paired teeth are displaced from the substantially perpendicular direction. Here again, the particular surface may vary widely, but a simple scarfed surface 15 is quite acceptable. By virtue of the surfaces on paired teeth 8, upon embedding the teeth into a nailable member, the paired teeth will be displaced from the perpendicular direction 9 whereby portions of the nailable member may be clenched between adjacent paired teeth. In this later regard, it should be clearly understood that the clenched portion of the nailable member need not be between the two teeth forming a pair of teeth, but may be between any two adjacent paired teeth. In this sense, an adjacent tooth is defined as a tooth in proximity to another tooth and where there is no other tooth therein between. Thus, all of teeth 16 in FIG. 1 are "adjacent" teeth.

In the embodiment shown in FIGS. 1-4, each slot 2 has associated therewith three teeth, i.e. one single tooth and two paired teeth forming a pair of teeth. In this regard a "paired" tooth is defined to mean those teeth on one side of the plate which form rows of pairs of teeth. It does not necessarily refer to one of the two teeth forming a pair of teeth. It may be any of the teeth on the side of the plate having pairs of teeth. Thus, in the embodiment of FIGS. 1-4, there will be two paired teeth for each single tooth and, thus, the proportion of single teeth to paired teeth will be 0.5:1. It should be understood, however, that it is not necessary to maintain this proportion and the smaller proportion of single teeth may have a ratio with the larger proportion of paired teeth which can vary from as little as 0.2:1 to as high as 0.8:1. It has been determined, however, that the optimum ratio is about 0.5:1, and for the sake of succinctness, this preferred embodiment will be discussed hereinafter.

The number of rows of teeth in any fastener along its width may vary with the particular use intended for the fastener. Generally, there will be at least two rows and up to forty rows, although usually, the fasteners will have three to six rows, and particularly the four rows as shown in FIG. 1. With this arrangement, the length L and L' of the single teeth and paired teeth, respectively, may be from as little as $\frac{1}{8}''$ to as great as $\frac{3}{4}''$, but generally these lengths will be less than $\frac{1}{2}''$. Also, optimumly, the teeth will be greater than $\frac{1}{4}''$. Lengths of approximately 3/16'' are optimum.

It should also be appreciated that L and L' need not be the same, although generally speaking this will be the case, as shown in FIGS. 1–4.

The cross sectional area of the single teeth will be larger than the cross sectional area of the paired teeth. As explained above, it is intended that the single teeth are not substantially displaced from the perpendicular when being embedded in the nailable material, while the paired teeth are to be so displaced. To insure this result, the cross sectional area of the single teeth is great enough so that such displacement is not substantially effected in normal material while the cross sectional area of the paired teeth is sufficiently small that such displacement is so effected. The amount of displacement of the paired teeth is not narrowly critical, since any small amount of displacement will substantially improve the strength of the lap joint by increasing the withdrawal resistance of the paired teeth. However, the average angle $\theta$ of the displaced paired teeth should be less than 85° and more preferably less than 80°. Average displacement of 75° or less are preferred. In this regard, the term "average displacement" is defined to mean that the displacement need not be in a straight line and the displacement may take the form of a curved path. However, the average angle of the curved path will be in the range noted above.

To accomplish displacements of the above-noted ranges, and in keeping with avoiding displacement of the single teeth, the ratio of the cross sectional area of the single teeth to that of the paired teeth is always greater than 1:1 and usually greater than 1.5:1. Optimumly, the ratio is at least approximately 2:1.

The actual cross sectional area of both the single teeth and paired teeth can vary with the intended nailable materials. Of course, for relatively soft nailable materials the cross sectional areas of both the single and paired teeth may be smaller than the cross sectional area of those teeth when the fasteners are intended for harder materials. With the above ratios in mind, however, the cross sectional area of the single teeth may be from as little as about 0.002 square inches to as high as about 0.02 square inches, although for special purposes cross sectional areas outside of this range may be used.

As noted above, the preferred embodiment is where the teeth struck from the sheet metal plate leave slots in the plate such that one single tooth and two paired teeth, forming a pair of teeth, leave one slot. This is the arrangement shown, particularly, in FIG. 4. These slots form rows in the sheet metal plate, and the slots have longitudinal dimensions 1 which are greater than the transverse dimensions t. This insures that the length L and L' of the teeth are in a correct ratio with the cross sectional area of the teeth, for the reasons noted above.

It is an important feature of the invention that the single tooth and the two paired teeth forming a pair of teeth project from the same longitudinal side of the associated slot, as shown in FIG. 4. This increases the total columnar strength from one side of the plate to the other and minimizes the buckling moment in transferring load between the paired teeth and the single teeth. Optimumly, the center lines 17 of the paired teeth will fall on the center line 18 of the single tooth, although this is not practical for convenient manufacturing; bearing in mind the necessities of a die and punch. However, the distance D between the center lines should be minimized to provide increased columnar strength. Most preferably, distance D should not be greater than three times the thickness T of the single tooth and more preferably less than two times the thickness of the single tooth, in order to optimize this columnar strength. Herein, this relationship is referred to as the single tooth and a pair of paired teeth associated with a slot being disposed at least adjacent to a single plane, i.e., the term "adjacent" means within the ratios noted above. Most preferably, the paired teeth and single teeth will be adjacent to a single plane to the extent that the juncture between the sheet metal plate and the single tooth abuts the juncture between each of the teeth forming a pair of paired teeth. This further requires that the portion of the sheet metal forming a single tooth be struck from the plate between the portions of the sheet metal forming a pair of paired teeth.

The two paired teeth and one single tooth projecting from a slot in a row of slots may be projected from the same longitudinal side of the slots as the side of the slots from which teeth project in one or both of adjacent rows of teeth. However, it is preferred that teeth in adjacent rows of teeth project from the opposite longitudinal side of the respective slot as shown in FIGS. 1–3. This gives a more random disposition of the teeth, which minimizes marring of lap joints by nonuniform density of teeth in a particular localized area of the fastener.

The embodiments shown in FIGS. 1–4 are such that the teeth will be moved away from each other and clenched between adjacent paired teeth. This arrangement is preferable for crushable material, such as wallboard, since it will maximize the distance between clenched teeth. On the other hand, with noncrushable material, such as wood paneling, the paired teeth in a pair of teeth may move toward each other by reversing the slope of the scarf.

The number of teeth struck from a plate should not be so great as to weaken the overall plate structure. Accordingly, the planar area of the sheet metal plate which is struck into teeth may be from 25% to 80%, usually from 50% to 75%. This is, however, no more than 80% of the planar area of the sheet metal plate is struck into teeth. This avoids undue weaking of the plate per se.

FIG. 5 shows in exploded view a lap-joint according to the present invention. The particular embodiment of that figure shows a side elevation of a wall panel comprised of a top plate 20, a bottom plate 21, and side studs 22. Fasteners 23 fasten top plate 20 and bottom plate 21 to studs 22. Additional fasteners 24 secure outer panel member 25 to the plates and studs. As can therefore be seen, the lap joint comprises a first nailable member (the assembled plates and studs) a second nailable member (the outer panel) which is at least in part parallel to the first nailable member. In this particular case outer panel 25 overlies the assembly of plates and studs and is parallel in each dimension. For other lap joints, of course, an overlay is not required.

In the embodiment of FIG. 5, the single teeth are embedded in the first nailable member, i.e. the assembled plates and studs and the paired teeth are embedded in the second member, i.e. the outer panel. Instead of the plates and studs the first nailable member may be any wood member or wood derived materials such as pressboard, cork board, reconstituted board and the like. Instead of an outer panel, the second nailable material may be any wood or wood derived material or plaster board, e.g. plywood, cork board, pressed board, reconstituted board, sheating, planks, and the like.

It will be appreciated, however, that an important feature of the invention is versatility of the present fasteners. Thus, even though the teeth of the fasteners are relatively short in length, tight and withdrawal resistant lap joints may be formed in a wide variety of nailable members. Additionally, since the single teeth provide a firm and secure joint with the first nailable member, a secure total lap joint can be provided by the clenching action of the paired teeth, even though the paired teeth are relatively thin. For this reason, the present fastener can be used not only with the difficult situations noted above, but in the conventional situations. Under the circumstances, on-the-site construction may be completed in almost all instances with the present fasteners and there is no need for use of different fasteners for different jobs. For example, as shown in FIG. 5, the fasteners may join at least two of top plates, bottom plates and stud to provide the framing for a wall panel. The paired teeth are displaced from the perpendicular direction and clench the second nailable material, i.e. the wall panel. However just beside that construction, in lieu of the wooden panel, plywood, reformed wood or the like, heavy wooden planking may be required. By virtue of the clenching action of the paired teeth, a secure and withdrawal resistant joint may be formed even with the heavy planking. Thus, the workman can go from the difficult and critical kinds of jobs to the routine kinds of jobs without having to use a different fastener, according to this feature of the present invention.

The present fasteners also have advantages in prefabrication operations. As shown in FIG. 6, a conventional press 30, the details of which will not be given herein for succinctness, can press a wall panel composed of plates 31 and studs 32 with outer panel 33 by a similar system of fasteners 34 as used in connection with FIG. 5. However, for the same reasons expressed above, outer panel 33 may be serially changed from wood paneling to plaster board to reprocessed or pressed board to planking and the like without the necessity of having to change the fastener.

Thus, a joint may be made on-the-site with the present fastener or the fastener may be used in a prefabrication operation. In either regard, the advantages of the present fasteners are still enjoyed.

Accordingly, it can be seen that the objects of the invention have been met and that the invention provides advantages heretofore not available in the art. It is also clear that the invention may be embodied in other specific forms without departing from the spirit or central characteristics of the foregoing disclosure. The present embodiments are therefore to be considered in all respect as illustrative and not restricted, the scope of the invention be indicated by the appended claims rather than by the foregoing description, and all variations which come within the meaning and spirit of the annexed claims are intended to be embraced thereby.

What is claimed:

1. A fastener for and capable of itself forming lap-type joints between nailable members comprising, a planar sheet metal plate, a plurality of teeth integral with and struck from the plate to leave a plurality of rows of substantially parallel slots which have longitudinal dimensions in the direction of the rows which are greater than the transverse dimension thereof, three teeth being struck from each slot and projecting in a substantially perpendicular direction from the plane of the plate, a first portion of the said teeth being struck from the centers of said slots and projecting from one side of the plate to form rows of single teeth and a second portion of the said teeth struck from the sides of said slots and projecting from the other side of the plate to form rows of pairs of teeth, said single teeth being wider than said pairs of teeth and all of said teeth having a length greater than their width, the single tooth and the two paired teeth projecting from the other side of the plate forming respectively rows of single teeth and rows of pairs of teeth, the single tooth and the two paired teeth projecting from the same longitudinal side of the slot from which they are struck whereby the single tooth and the pair of paired teeth associated with a slot are disposed adjacent to but not in a single plane, the ends of the single teeth having surfaces such that upon movement of the single teeth into a nailable member the single teeth remain in the said substantially perpendicular direction, the ends of the paired teeth having surfaces such that upon movement of the paired teeth into a nailable member the paired teeth are displaceable from the said substantially perpendicular direction whereby portions of the nailable member may be clenched between adjacent paired teeth.

2. The fastener of claim 1 wherein the ratio of the sectional area of the single teeth to that of each of the paired teeth is at least approximately 2:1.

3. The fastener of claim 1 wherein at least 25% of the planar area of the sheet metal plate is struck into teeth.

4. The fastener of claim 1 wherein at least 50% of the planar area of the sheet metal plate is struck into teeth.

5. The fastener of claim 1 wherein the teeth in adjacent rows of teeth project from opposite longitudinal sides of the respective slots.

6. The fastener of claim 1 wherein the single teeth have an arcuate cross section.

* * * * *